US 7,657,546 B2

(12) United States Patent
Goodwin et al.

(10) Patent No.: US 7,657,546 B2
(45) Date of Patent: Feb. 2, 2010

(54) KNOWLEDGE MANAGEMENT SYSTEM, PROGRAM PRODUCT AND METHOD

(75) Inventors: Richard T. Goodwin, Dobbs Ferry, NY (US); Juhnyoung Lee, Yorktown Heights, NY (US); Youngja Park, Edgewater, NJ (US)

(73) Assignee: International Business Machines Corporation, Armonk, NY (US)

( * ) Notice: Subject to any disclaimer, the term of this patent is extended or adjusted under 35 U.S.C. 154(b) by 372 days.

(21) Appl. No.: 11/340,246

(22) Filed: Jan. 26, 2006

(65) Prior Publication Data

US 2007/0174270 A1     Jul. 26, 2007

(51) Int. Cl.
    *G06F 7/00*     (2006.01)
    *G06F 17/00*     (2006.01)
(52) U.S. Cl. ..................................... 707/100
(58) Field of Classification Search ................ 707/100, 707/7
See application file for complete search history.

(56) References Cited

U.S. PATENT DOCUMENTS

| | | | | |
|---|---|---|---|---|
| 5,819,258 | A * | 10/1998 | Vaithyanathan et al. | 707/2 |
| 6,631,365 | B1 * | 10/2003 | Neal et al. | 707/2 |
| 6,701,314 | B1 * | 3/2004 | Conover et al. | 707/7 |
| 6,976,036 | B2 * | 12/2005 | Lau et al. | 707/200 |
| 7,162,480 | B2 * | 1/2007 | Vishik | 707/101 |
| 7,275,063 | B2 * | 9/2007 | Horn | 707/102 |
| 2002/0133504 | A1 * | 9/2002 | Vlahos et al. | 707/104.1 |
| 2003/0033333 | A1 * | 2/2003 | Nishino et al. | 707/531 |
| 2003/0177112 | A1 * | 9/2003 | Gardner | 707/3 |
| 2005/0060311 | A1 * | 3/2005 | Tong et al. | 707/7 |
| 2005/0144162 | A1 * | 6/2005 | Liang | 707/3 |
| 2006/0156220 | A1 * | 7/2006 | Dreystadt et al. | 715/501.1 |

OTHER PUBLICATIONS

Halkidi et al, "Thesus: Organizing Web document collections based on link semantics", the VLDB Journal, Springer-Verlag, Sep. 17, 2003, pp. 320-332.*

Sheth et al, "Managing Semantic Content for the Web", IEEE Internet Computing, IEEE, Aug. 2002, pp. 80-87.*

Patel Chintan, et al., "Ontokhoj: A Semantic Web Portal for Ontology Searching, Ranking and Classification" Proceedings of the Fifth ACM International Workshop on Web Information and Data Management, Nov. 7, 2003 pp. 58-61.

Ding Li, et al., "Swoogle: A Search and Metadata Engine for the Semantic Web" Proceedings of the Thirteenth ACM Conference on Information and Knowledge Managment (CIKM '04), Nov. 8, 2004 pp. 652-659.

(Continued)

*Primary Examiner*—James Trujillo
*Assistant Examiner*—Marc Somers
(74) *Attorney, Agent, or Firm*—Law Office of Charles W. Peterson, Jr.; Brian P. Verminski, Esq.

(57) ABSTRACT

An ontology directory service tool, computer program product and method of automatically discovering ontology file categories. A web search unit searches a network (e.g., the Internet) for semantic data files, e.g., semantic web pages. A preprocessing unit generates an ontology file from the content of each identified semantic data file. A category discovery unit identifies a domain for each ontology file and provides training sets for training ontology file classification. A classification unit trained using the training sets, classifies ontology file instances into inherent ontology categories.

14 Claims, 7 Drawing Sheets

OTHER PUBLICATIONS

Supekar Kaustubh, et al., "Characterizing Quality of Knowledge on Semantic Web" Proceedings of the Seventh International Florida Artificial Intelligence Research Society Conference (Flairs 2004) vol. 2 May 17, 2004.

Ding Li, et al., "Finding and Ranking Knowledge on the Semantic Web" Lect. Notes Comput. Sci. (Proceedings of Confence, ISWC 2005) vol. 3729, Nov. 6, 2005 pp. 156-170.

Kim H M, et al., "Towards a Data Model for Quality Managment Web Services: an Ontology for Measurement Enterprise Modeling" Lecture Notes in Computer Science (Advanced Information Systems Engineering. 14th International Conference, Caise 2002) vol. 2348, 2002, pp. 230-244.

Ruiz-Casado M, et al., "Automatic Assignment of Wikipedia Encyclopedia Entries to Wordnet Synsets" Lect. Notes Comput Sci. (Proceedings of Advances in Web Inteligence Third International Atlantic Web Inteligence Conference AWIC 2005) vol. 3528, Jun. 6, 2005 pp. 380-386.

Hee-Cheol Seo, et al., Unsupervised Word Sense Disambiguation Using Wordnet Relatives Computer Speech Lanuage, vol. 18, No. 3, Jul. 2004 pp. 253-273.

* cited by examiner

KNOWLEDGE MANAGEMENT SYSTEM, PROGRAM PRODUCT AND METHOD

BACKGROUND OF THE INVENTION

1. Field of the Invention

The present invention generally relates to knowledge management, and especially to intelligent data mining remotely located web pages and classifying located web page content.

2. Background Description

Search engines are well known in the art for locating and retrieving web based information. A typical search engine searches based on the syntax of queries, limiting each search to simply matching the query keywords to the same or similar words in a target document. Once the search engine returns search results from a query, the search engine user has the burden of selecting and examining the identified documents (hits). Depending on the query structure, the search engine may return tens or hundreds of thousands or even millions of hits. Since, depending upon connection speed, viewing each hit may take a significant amount of time, locating links to the best information in the search results may be an impossible task. Also, frequently, the search results include a significant number of hits that are totally unrelated to the subject of the query. Frequently, for example, one hears of porn sites turning up for a seemingly innocuous and unrelated search query.

Consequently, universities, government and enterprises are continually trying to develop methods to improve search engine database queries. Some of these methods are focused on deriving the semantic meaning of queries and organizing information to be accessible to semantic queries. For example, the World Wide Web Consortium (W3C) standard organizations started the Semantic Web Project. The Semantic Web Project was formed to organize web based information using Semantic Markup Language (SML) into semantic web pages. The semantic web pages are organized according to word relationship to improve the information retrieval. Typically, SML content is dispersed over the Internet without any cohesive organization. Though SML content is available, it is not available content in an organized manner, which would assist researchers attempting to improve search engines.

Thus, there is a need for semantic based search tools for quickly and easily identifying and retrieving information based and more particularly, for developing tools to facilitate developing semantic based search tools.

SUMMARY OF THE INVENTION

It is therefore a purpose of the invention to extract inherent categories from semantic data files;

It is another purpose of this invention to extract inherent categories from semantic web pages;

It is yet another purpose of the invention to automatically discover categories from ontology files for semantic web pages;

It is yet another purpose of the invention to automatically discover and manage discovered categories from ontology files for semantic web pages.

The present invention is related to an ontology directory service tool, computer program product and method of automatically discovering ontology file categories. A web search unit searches a network (e.g., the Internet) for semantic data files, e.g., semantic web pages. A preprocessing unit generates an ontology file from the content of each identified semantic data file. A category discovery unit identifies a domain for each ontology file and provides training sets for training ontology file classification. A classification unit trained using the training sets, classifies ontology file instances into inherent ontology categories.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
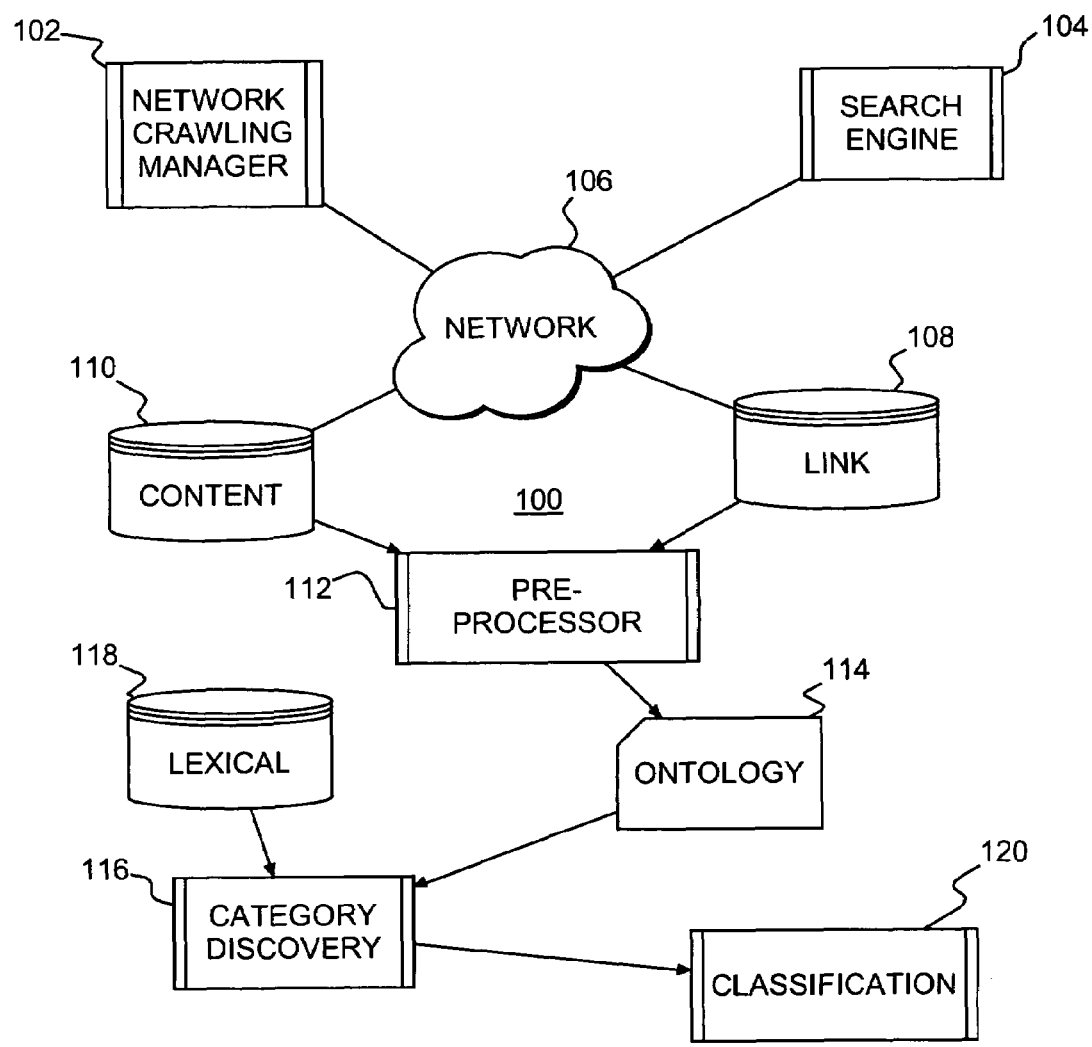
FIG. 1 shows an example of an ontology directory service tool for automatically discovering ontology file categories according to a preferred embodiment of the present invention.

Turning now to the drawings, and more particularly, FIG. 1 shows an example of an ontology directory service tool 100 for automatically discovering ontology file categories according to a preferred embodiment of the present invention. Semantics deal with the meaning of words in the context of sentences and paragraphs that use these words. Ontology structures these meanings to formulate a rigorous conceptual relationship of the meanings within a domain or field. A domain or field is a super-category such as geography, animals, food, finance or shopping. Ontology is typically represented in a hierarchical data structure containing all the relevant entities, their relationships and rules within the domain.

A network crawling manager 102 connects to a search engine 104 over a network 106, e.g., over the Internet. The search engine 104 locates semantic web pages, i.e., those web pages written in a Semantic Markup Language (SML) such as Web Ontology Language (OWL) and Resource Description Framework (RDF). Links to the located semantic web pages are stored in link database 108. Content in the linked semantic web pages are cached in a content database 110. A preprocessor 112 preprocesses files in the content database 110 into ontology files 114, each of which contains, for example, a list of the words in the corresponding web page and some metadata for each word, e.g., word frequency and word location. A category discovery unit 116 uses a lexical database 118 to discover categories for keywords in the ontology files 114 and select a single category for each ontology file 114 (sometimes referred to as a bag of words from the discovered categories. Thus, each selected category is inherent in the ontology files 114, not artificially or manually generated. A classification unit 120 uses the selected categories to classify instances from the ontology files 114 for verification, and thereafter, continuously initiate updates to the selected categories as frequently as system metrics indicate such updates are necessary.

Figure 2:
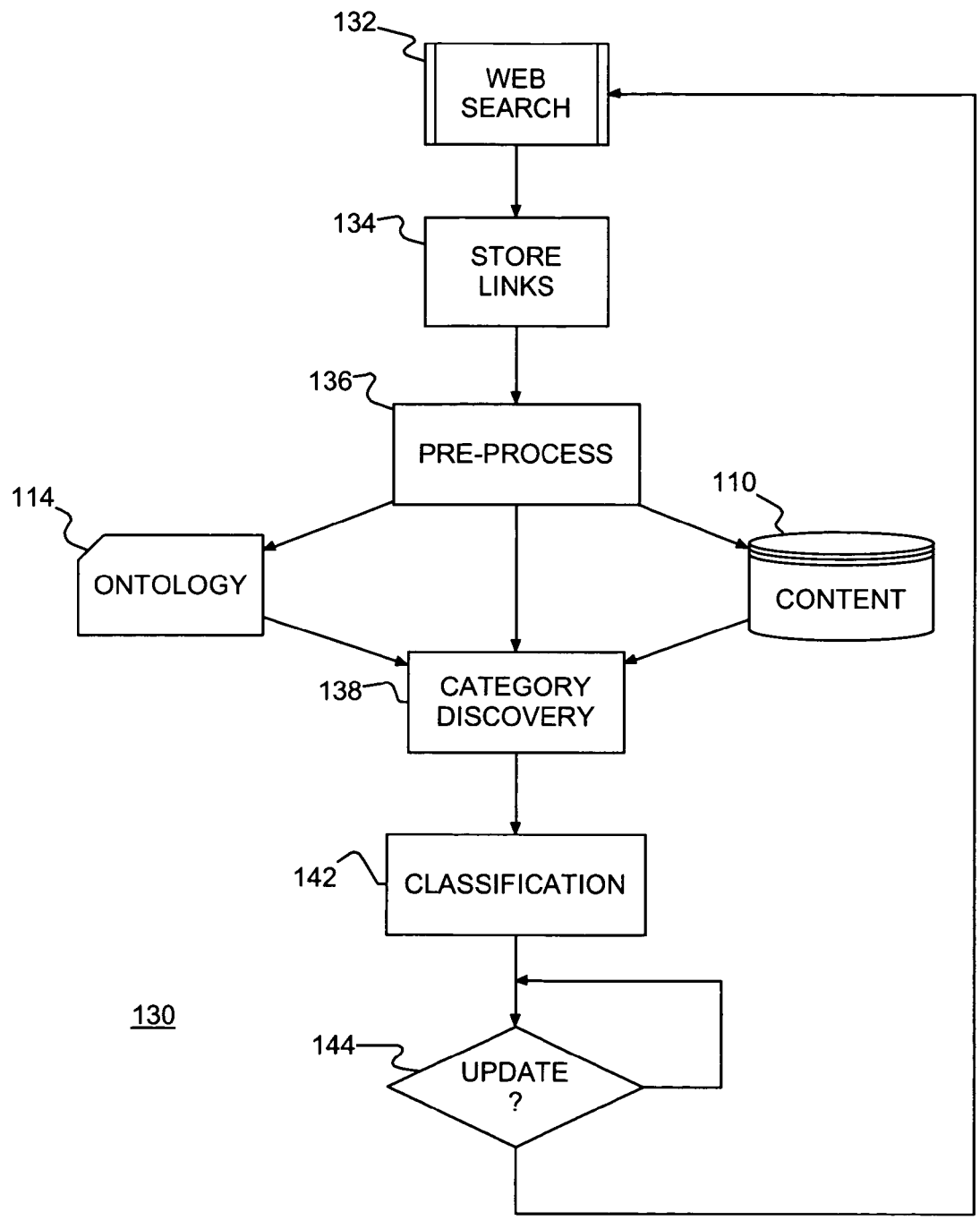
FIG. 2 shows a flow chart example 130 of discovering categories and classifying ontology files.

FIG. 2 shows a flow chart example 130 of discovering categories and classifying ontology files. In step 132, the search engine (e.g. 104 in FIG. 1) searches the network (106) for semantic web pages. Then, in step 134 links to identified semantic web pages are stored in the link database (108). In step 136, the search results are preprocessed, as content from linked semantic web pages are stored in content database (110). The content is parsed and passed to a natural language processor which distills the partial results, for example, into class, property, instance in processed ontology files 114 for subsequent text mining. In category discovery step 138, inherent categories are determined for the processed ontology files, and a set of domains are defined. In step 142, the ontology files are classified, and if, as determined necessary by tool metrics, categories may be further refined, e.g., by tweaking tool control parameters. In step 144, as SML content changes, either from semantic documents changing or new SML documents being located, for example, tool metrics indicate such a change is in order and the categories and classification are updated, repeating steps 132-142.

Figure 3A:
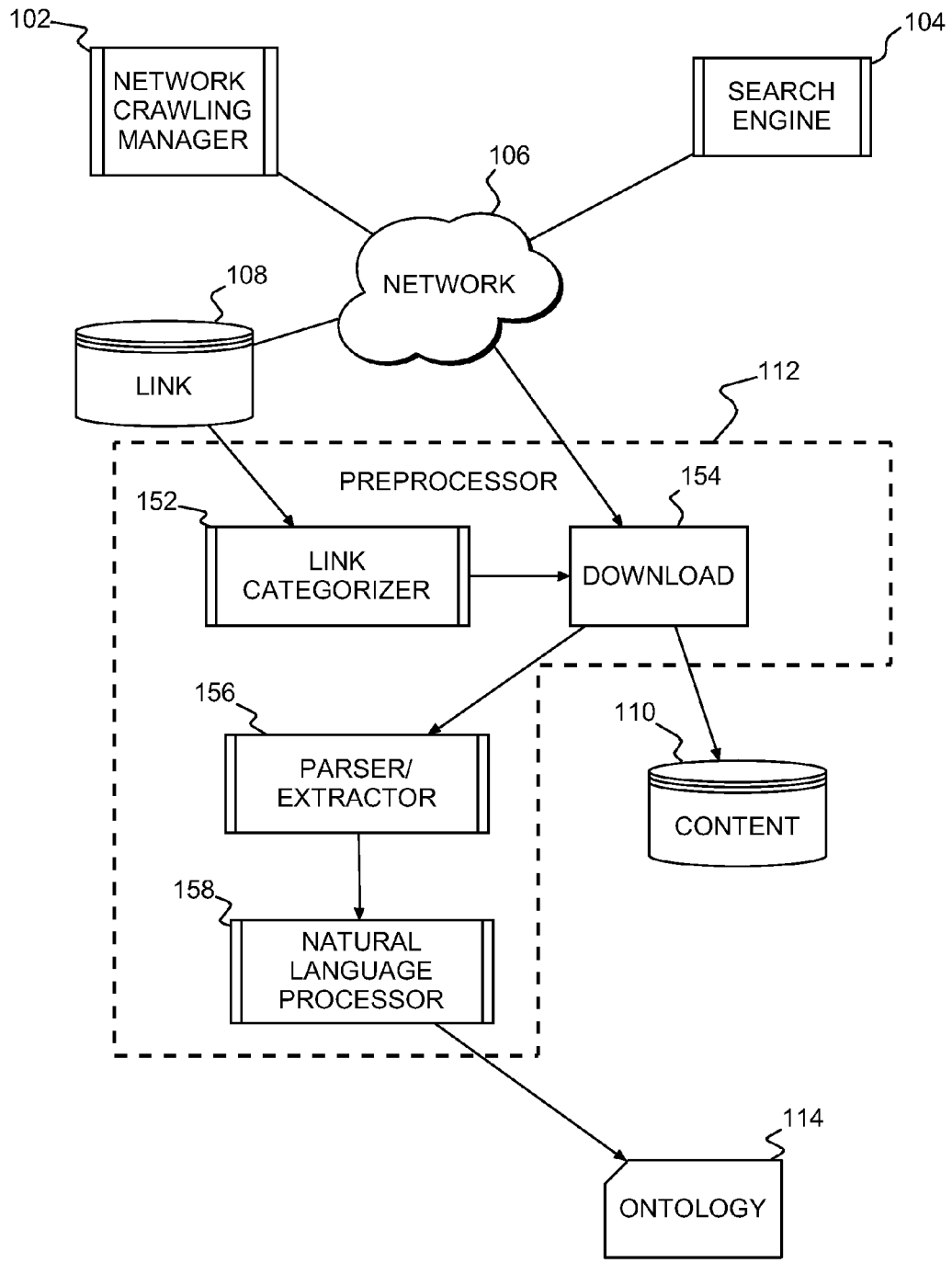
FIGS. 3A-B show an example of data flow in a preferred ontology directory service tool.
Figure 3B:
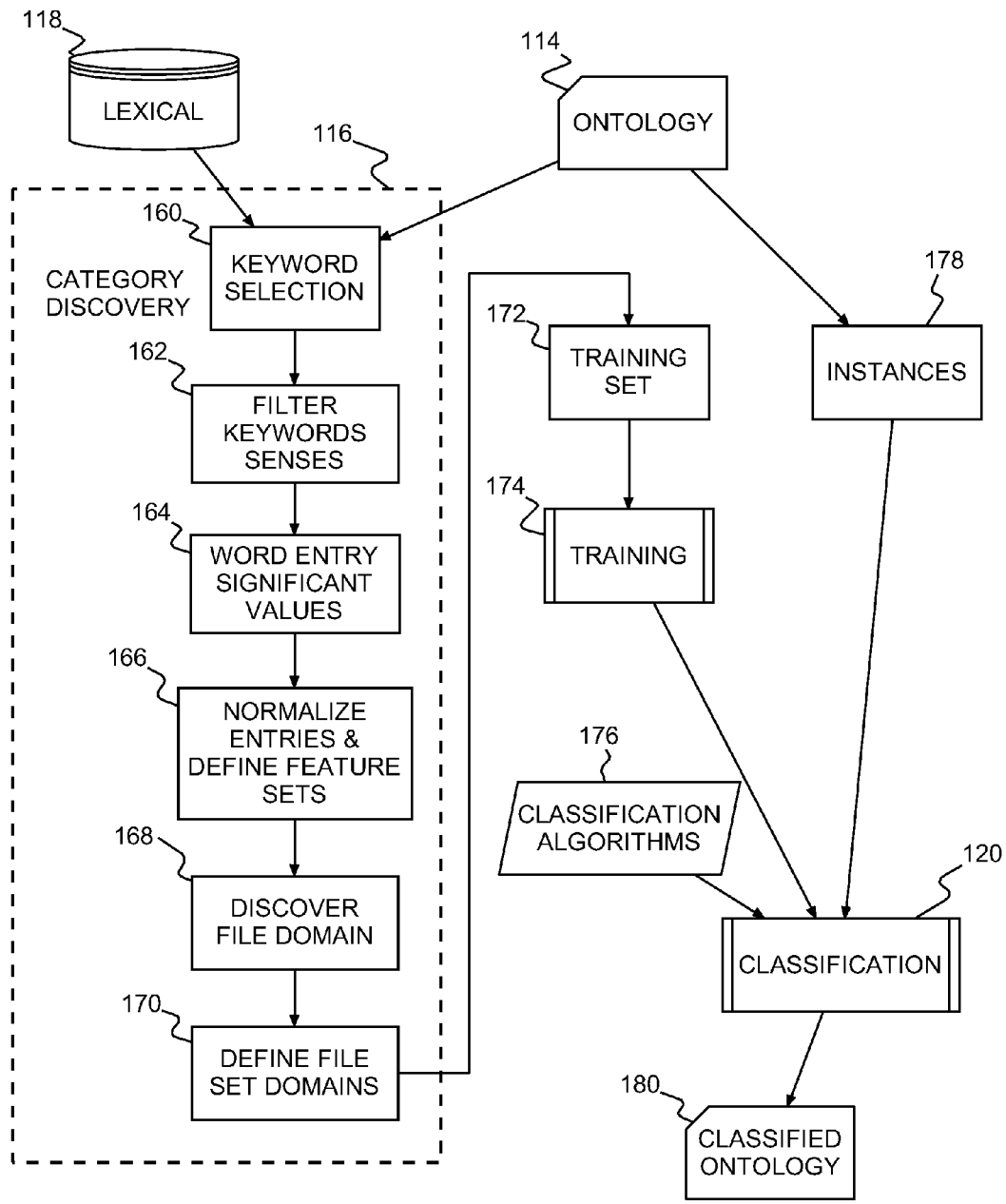

FIGS. 3A-B show an example of data flow in the preferred embodiment ontology directory service tool 100 of FIG. 1 with like features labeled identically and with reference to FIG. 2. The network crawling manager 102 directs the selected search engine 104 to identify only semantic web pages among web pages available on the network 106, and collect data from those identified semantic web pages. The search engine 104 may be, for example, WebFountain™ from International Business Machines Corporation (IBM), or the Trevi search engine, also from IBM. Links to the semantic web pages are stored in the link database 108 for preprocessing. A link categorizer 152 in the preprocessor 112 preprocesses the semantic web pages and downloads content 154 in the linked semantic web pages. The downloaded content is cached in the content database 110. A parser/extractor 156 parses cached content from the content database 110 to extract keywords. The extracted keywords are passed to a natural language processor 158 that generates processed ontology files 114 for category discovery.

The category discovery unit 116 first selects keywords 160 from each ontology file 114. Initial classification may be bootstrapped from the lexical database 118. A sense filter 162 selects one or more senses for each selected keyword, which are relevant to the domain of the ontology file, by using the lexical database 118 to determine a significance value 164 for each selected keyword. The significance values 164 are a significance measure of senses from ontological synonym sets or synsets for each keyword that may be used to measure the context of each ontology file. A feature set 166 containing significant senses is defined for each ontology file and the feature set of each ontology file is normalized for comparison with other feature sets. The senses for each feature set are examined to select one sense (i.e., a domain or category) 168 that represents the corresponding ontology file as the ontology file category. Statistics are extracted for discovered domains 168 and used to select a number (e.g., a few dozen) of categories 170 representing the entire set of ontology files. Thus, although the directory service may start with a few dozen categories, the number of categories can grow as the directory service serves more and more ontology files. So, by hierarchically structuring the categories, better navigational support can be provided as that number grows.

Tool metrics also are available for measuring the effectiveness of category discovery unit 116, e.g., by measuring the resulting categories against specific metrics. The final categories 170 are part of a training set 172 to the classification unit 120. The training set 172 also includes ontology file feature sets and corresponding specific instances of ontology files. These ontology file instances may include words that are used in the semantic files. Also, the ontology file instances may include tag names of semantic markup languages that are used to specify the properties of the words. The training set 172 is passed to a training unit 174 for classification raining. Training results from training unit 174 are passed to classification unit 120. Preferably, the classification unit 120 is operating a suitable classification or data mining algorithm 176, such as Weka, developed by the University of Waikato in New Zealand. The classification unit 120 applies the classification algorithm, guided by the training results, to instances 178 from one or more groups of ontology files 114 to generate classified ontology files 180.

Thereafter, as better categories are discovered, classified ontology files 180 are used to validate the accuracy of category discovery unit 116 based on the metrics. Further, the discovered categories provide a feature set for use with a classification algorithm. Moreover, categories are updated for new/modified ontology files and as results are classified, the classification unit 120 continuously trains and retrains as needed. In particular, ontology file trends may be detected and ontology categories updated to cope with the file changes or as new SML documents are located.

Figure 4:
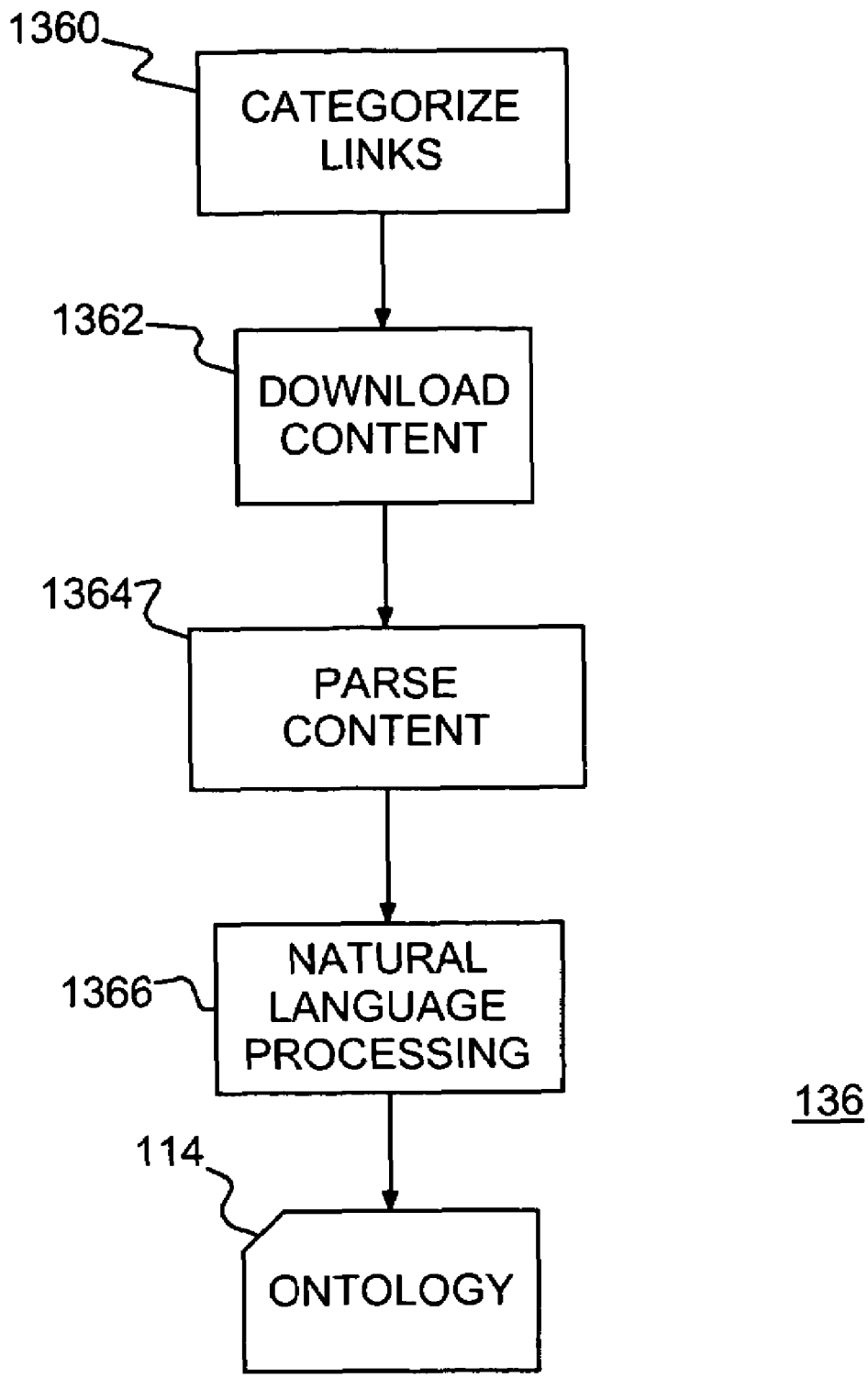
FIG. 4 shows an example of the preprocessing step in more detail.

FIG. 4 shows an example of the preprocessing step 136 in more detail. First, in step 1360, semantic links from the link database 112 are categorized according to domain name (e.g. .com, .edu, .gov), language, date/time stamp and/or size. Then in step 1362, the semantic web page content is downloaded, (e.g., using GNU wget) into content database 110. In step 1364, the semantic web page content is parsed, e.g., using Semantic Network Ontology Base (SNOBase) from IBM, and names (e.g., class, property, and instance) are extracted as keywords for text mining. Then in step 1366, those keywords are processed in a natural language processor to filter, clean and segment the keywords and to identify synonyms, acronyms and antonyms. The results from natural language processing are the processed ontology files 114 that are passed to category discovery.

Figure 5:
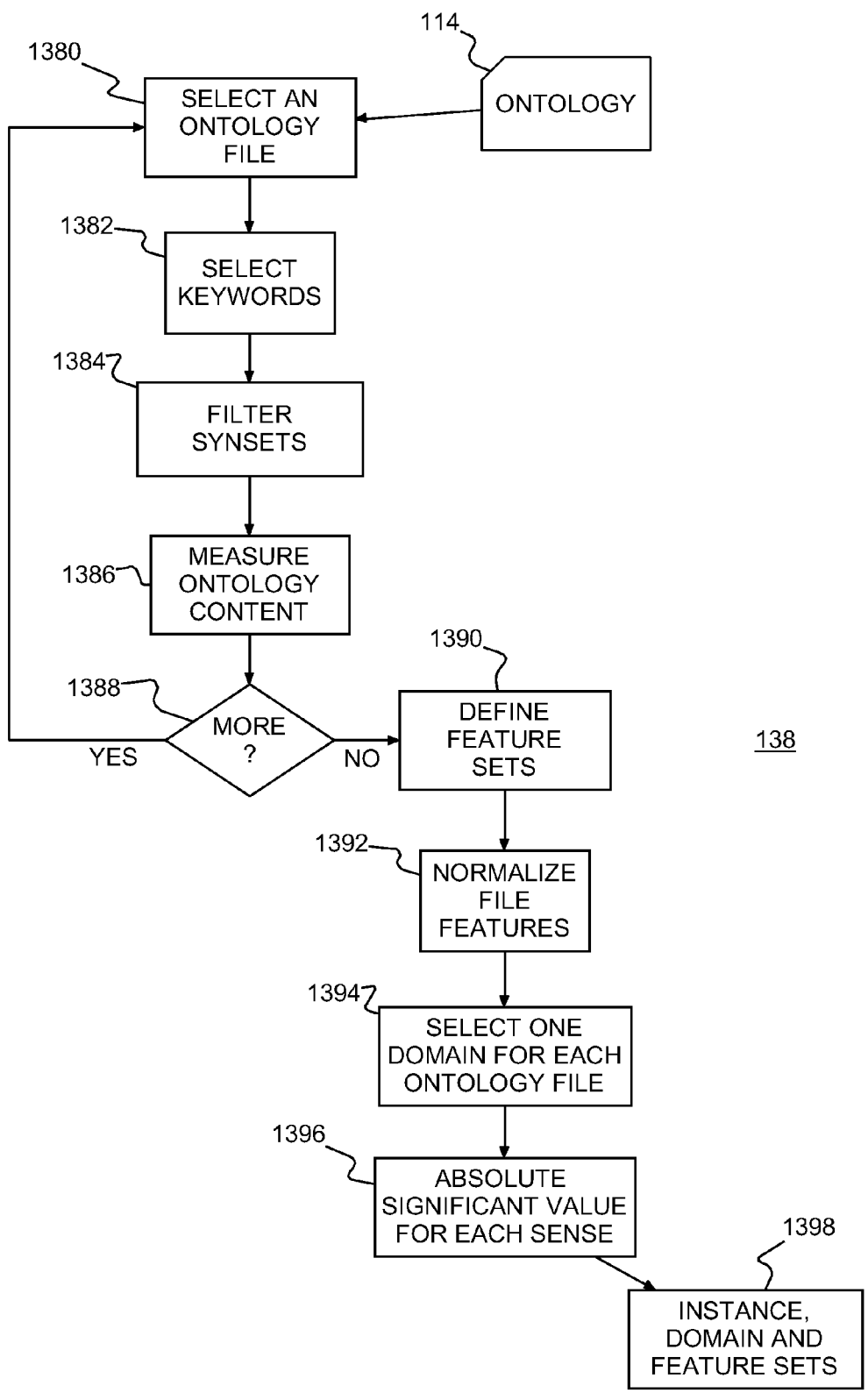
FIG. 5 shows an example flow chart of the category discovery step in more detail.

FIG. 5 shows an example of the category discovery step 138 on processed ontology files in more detail. Starting in step 1380, a processed ontology file is selected. In step 1382 keywords are selected from the selected ontology file. When the selected ontology file includes several category alternatives, the one that is best suited for category discovery is selected. Keywords may be selected based on a combination of factors including, for example, the frequency each keyword occurs in the file, keyword location in the file (e.g., in the Title, or in a sub-section), word type (e.g., noun or verb). Then, in step 1384, the keywords are filtered to identify a sense, or semantic meaning from each keyword, guided by the lexical database 118. This sense or semantic meaning is referred to as its synset. WordNet®, an online lexical reference system from Princeton University, is a typical suitable lexical database 118. In step 1384, synsets relevant to a given ontology for each keyword are filtered to provide one or more synsets for each word, or to select one or more synsets for each keyword. In step 1386, a context measure is determined for each ontology file by measuring the significance of senses from the selected synsets. In step 1388, the ontology files are checked to determine if all have been selected and, if not, returning to step 1380, another file is selected. When in step 1388 it is determined that all have been selected, then in step 1390 a feature set containing significant senses is defined for each ontology file. In step 1392 features of each ontology file are normalized for comparison with other feature sets. Each sense represents a domain within an ontology file and in step 1394, one domain is selected to represent each file. The degree of domain specificity can be determined by the position or level of the chosen sense in the hypernym tree. The selected domain should have an intermediate degree (selected from the mid-range) of specificity and so, not too specific, nor too generic. In step 1396 the contextual significance values of the domains are normalized relative to all of the domains in the processed ontology files to determine a unique or absolute significant value for each domain. In step 1398 discovered domains and features are combined with the input ontology file set (instance set) and output as an instance set, domain set, and feature set that are provided as the input to the classification unit 120.

The lexical database provides a guide for deriving the ontology or semantic meaning of keywords and their relationships. For example, sentence elements such as nouns, verbs, adjectives, and adverbs may be organized into synsets that are presented in hierarchal hypernym trees. Keywords can be any descriptive word, such as actor, bank, view or wine, for example. Ontology for exemplary keyword view can have two senses: a way of regarding situations or topics, such as position, view, perspective; and, a visual perception of a region, such as, aspect, prospect, scene, vista, panorama. Hypernyms for the first sense can be: that which is perceived, such as an entity; an integrated set of attitudes and beliefs, or an attitude, a mental attitude, such as orientation; or, a complex mental state. Hypernyms for the second sense can be a visual perception arising from sight; or, something that is perceived such as percept, perception, perceptual experience or entity. For example, the hypernym tree has several synset branches that give synonymous meaning of each sense at different levels. Hypernyms can range from specific or low-level synsets to generic or high-level synsets. Entity is the most generic high-level synset, and is the same for both senses. Further, entity represents the domain sense for the two senses. Each keyword has one or more associated senses. Each sense presents a different "flavor" of the keyword. Further, each sense has one or more hierarchal synsets that may be organized (in a lexical database) in a hypernym tree, where higher-level synsets are more generic than lower-level synsets.

Figure 6:
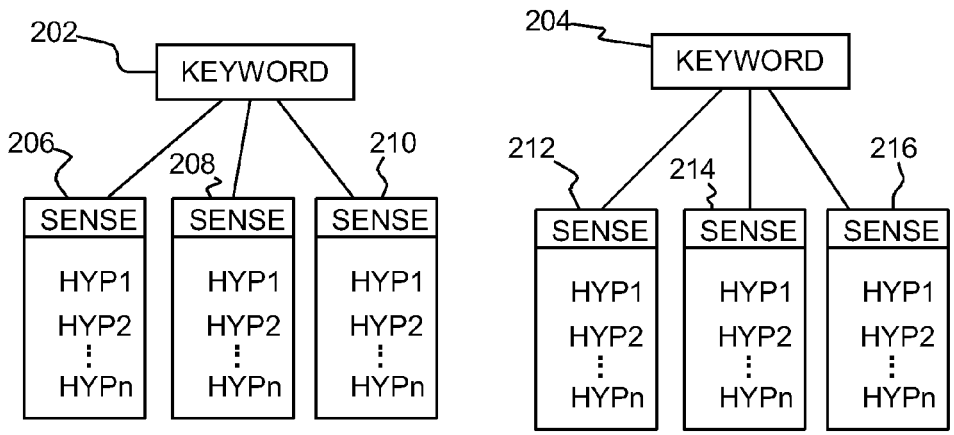
FIG. 6 shows a pictorial example of the hierarchal sense representation or hypernym tree for two keywords for keyword sense filtering.

FIG. 6 shows a pictorial example of the hierarchal sense representation or, hypernym tree, for two keywords 202, 204 for keyword sense filtering, e.g., 162 in FIG. 3B. Each keyword 202, 204 has three exemplary senses 206, 208, 210, and 212, 214, 216, respectively. Each sense 206, 208, 210, 212, 214, 216 includes a hypernym tree with n hypernyms. Preferably, keyword sense filtering results in senses of keywords that are relevant to a given ontology and limits the number of senses for consideration in domain/feature selection. Further, since a crowded sense space will lead to meaningless, top-level senses for a domain, keyword sense filtering also serves to avoid space crowding. Also, preferably, keyword sense filtering selects meaningful, effective senses, or filters out out-of-context senses for results that are the most relevant senses for each keyword. In a context-insensitive approach, the sense filter matches keywords to senses that occur most frequently, and therefore, have a high significance value. Alternately, in a context-sensitive approach, using what is known as disambiguation, the meaning description (glosses) of senses of a keyword are compared with the glosses of other keywords and, for each keyword, glosses with the most commonality among keywords are selected. Then, each sense having the most shared glosses with other keywords is selected, and those senses are assigned to the keyword. So, using a context-insensitive approach, for example, senses 206, 210 may be removed upon determining that keyword 202 is better represented by sense 208 and, similarly, sense 214 is removed upon determining that keyword 204 is better represented by senses 212 and 216. By contrast, the context-sensitive approach compares the gloss for each sense (e.g., 206) with the gloss of senses of other keywords 208, 210, 212, 214, 216. So, if the gloss for sense 206 overlaps with the glosses for senses 212 and 216, the result is the same as for the context-insensitive approach. In both of these alternate approaches, less relevant senses are removed or filtered out.

Figure 7:
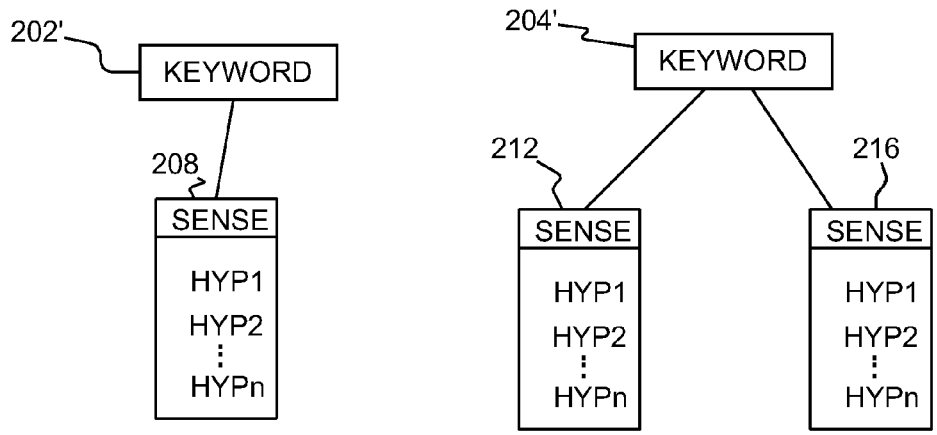
FIG. 7 shows a pictorial example of the filtered word senses for the two keywords of FIG. 6 for measuring ontology file context.

FIG. 7 shows a pictorial example of the filtered word senses for the two keywords 202', 204' of FIG. 6 for measuring ontology file context, e.g., 164 in FIG. 3B. So, by quantifying the contextual significance of each sense in each hypernym tree, each tree is assigned a numerical significance measurement, e.g., by summing contextual significances of all senses in a particular hypernym tree. The significance value of a sense may be determined by the frequency of a word in the hypernym tree and also the frequency of the word in the description of senses in the tree, e.g., given by WordNet. Once quantified, the hypernym trees can be sorted according to contextual significance. Preferably, if two senses of a hypernym tree have the same frequency and so the same significance value, low-level senses (more specific or further from the root of the tree) are favored over high-level senses (more generic or positioned closer to the root of the hypernym tree). Since high-level senses tend to be common across many hypernym trees. Selecting a high level sense set has little effect of distinguishing senses in the feature. So, low-level senses are favored to mitigate the effect of more frequent appearance of high-level senses. So, for the present example, contextual significance of sense 208 is computed from significance values (e.g., 7, 5, . . . 6) attached to hypernyms Hyp1-Hypn; contextual significance of sense 212 is computed from significance values (e.g., 5, 8, . . . 4) attached to hypernyms Hyp1-Hypn; and, contextual significance of sense 216 is computed from significance values (e.g., 9, 10, . . . 5) attached to hypernyms Hyp1-Hypn. Further, these significance values can be weighted, e.g., to favor low-level senses.

Figure 8:
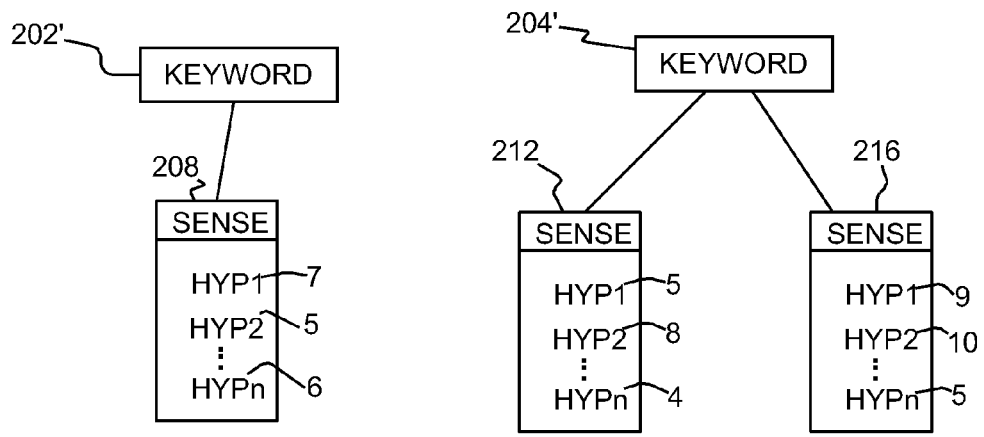
FIG. 8 shows a pictorial example of the two keywords after measuring ontology file context in FIG. 7 and presented for defining the feature set.

FIG. 8 shows a pictorial example of the two keywords 202', 204' after measuring ontology file context and presented for defining the feature set, e.g., 166 in FIG. 3B. The keyword senses 208, 212, 216 are normalized and a feature set is determined for the file. Preferably, the senses 208, 212, 216 are sorted by significance value. The significance value of each sense is normalized so that each hypernym has an unique significance value. Each of a predetermined number of hypernyms are selected, and each is normalized to a sense at a predetermined position in the hypernym tree for that selected sense. This normalization provides a controlled set of features for subsequent classification. Normalization may be done, for example, in either a simplistic approach or a weighted approach. In the simplistic approach, a count is assigned to the senses, i.e., the overall appearance count in the context of selected senses of keywords. This approach favors high-level senses that appear more frequently. In the weighted sum approach low-level senses may be weighted more heavily so that the weighted sum favors low-level senses. The resulting feature set is a set of normalized senses corresponding to high-value entries and is the feature set for the ontology.

Domain discovery, 168 in FIG. 3B, may be done, simply by selecting the highest value sense as the domain. If necessary, however, the selected domain may be normalized in its hypernym tree. This normalization may be necessary to insure that the selected domains are about at the same level in hypernym trees in terms of the distance from the root of the trees, which is "thing." In particular, normalization may be necessary to avoid a situation where one domain is very high-level, while another is very low-level. Also, senses may be sorted, if necessary (e.g., for a large number of senses) by traversing the hypernym tree. Once the domain is defined (discovered) for all ontology files, all of the discovered domains and features are combined for the input ontology file set (instance set) 114. The instance set, domain set, and feature set are forwarded as training set 172 to training 174 and classification 120.

Control parameters may be used to control the category discovery unit 116 and various measurements (metrics) may be collected that are indicative of the category discovery quality and whether process tuning may be in order. Control parameters include, for example, keyword selection parameters, e.g., 1, all, or in-between; weight factor for calculating significance of senses, i.e., how much to discriminate in hypernym tree; a maximum number of senses selected for each keyword for sense filtering; a maximum number of features for each ontology file to affect the subsequent classification; a normalization level for features in terms of position in sense hypernym trees; and, a normalization level for domains in terms of position in sense hypernym trees. Metrics include, for example, a domain set size as a percentage of the instance set and, preferably, that is maintained below a certain level, e.g., 30%; a singleton set size as a percentage of the domain set and, preferably, that is maintained below a certain level, e.g., 50%; a most frequent domain as a percentage of the instance set and, preferably, that is maintained below a certain minimum level (e.g., 20%) above which (too high-level), sense is meaningless; and a feature set size as a percentage of the instance set and, preferably, kept balanced. So, too many domains may be an indication that the domains are not well grouped and, by contrast, too specific domains may indicate that discovery is meaningless. Too many singletons may indicate that the domains are too specific and not grouped well. Selecting a top-level sense (e.g., thing, entity, or abstraction) as domain is a meaningless grouping. However, selecting a most frequent domain set may be acceptable. Thus, by monitoring category discovery results and comparing the results against the metrics, drift may be identified. Drift may result, for example, from changing or new SML file content. In response, the control parameters may be adjusted, when necessary, to bring the final instance set, domain set, and feature set to within the desired metrics.

Advantageously, the preferred embodiment ontology directory service tool automatically locates semantic web pages and discovers inherent ontology file categories within the pages. Thus, essentially, all semantic ontological content that is accessible, e.g., from the Internet, is collected and categorized based on ontology file categories inherent those pages. Further, monitoring category metrics, control parameters may be adjusted as necessary to refine and/or update the categories as needed.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

We claim:

1. A method of automatically discovering ontology file categories, said method comprising the steps of:
   a) searching for available semantic data files;
   b) storing links and content to identified semantic data files;
   c) generating an ontology file from stored said content for each linked said semantic data file;
   d) identifying a domain for each said ontology file, said domain being identified from generated ontology files;
   e) extracting a plurality of ontology file categories from domains identified for said generated ontology files, said ontology file categories being statistically identified automatically from said domains, extracting comprising:
      determining and normalizing contextual significance for all domains, each normalized contextual significance providing a significance value for a respective domain, and
      combining discovered domains and features for generated ontology files responsive to domain significance values;
   f) providing a training set from generated ontology files, said training set including an instance set, a domain set and a feature set; and
   g) classifying ontology file instances responsive to said training sets, results of classification indicating automatic category discovery effectiveness.

2. A method as in claim 1, the step (a) of searching comprising the steps of:
   i) searching the Internet for semantic web pages; and
   ii) storing links to identified said semantic web pages in said link database.

3. A method as in claim 2, wherein the step (i) of searching the Internet comprises limiting a network crawler to locating only web pages available over the Internet that are written in a semantic markup language, said method further comprising:
   h) classifying ontology file instances from one or more groups of ontology files responsive to said classification results to refine ontology file categories;
   j) receiving new/modified ontology files; and
   k) returning to step (d) to identify domains for said new/modified ontology files and update automatically discovered said ontology file categories.

4. A method as in claim 1, the step (b) of storing links comprising the steps of:
   i) storing said links in a link database;
   ii) applying categories to linked said semantic data files; and
   iii) downloading content from categorized said linked semantic data files, downloaded said content being stored in a content database.

5. A method as in claim 4, wherein the step (ii) of applying categories comprises grouping links stored in said link database by attribute.

6. A method as in claim 5, wherein said links are grouped by Internet domain and language; and, time and size.

7. A method as in claim 1, the step (c) of generating an ontology file comprising the steps of:
   i) parsing said content;
   ii) extracting names from parsed said content; and
   iii) converting said content into ontology files responsive to extracted said names and guided by a natural language processor filtering, cleaning and segmenting said names and identifying synonyms, acronyms and antonyms for said names.

8. A method as in claim 7, wherein the step (ii) of extracting extracts names from parsed said content according to class, property and instance for text mining.

9. A method as in claim 1, the step (d) of identifying domains comprising the steps of:
   i) selecting keywords from said each ontology file;

ii) filtering a sense from selected said keywords responsive to a lexical database; and
iii) identifying a domain in said each ontology file from said selected keywords.

10. A method as in claim 9, wherein the step (ii) of filtering senses filters synsets for each keyword.

11. A method as in claim 1, the step (g) classifying ontology file instances comprising the steps of:
   i) providing classification parameters from said training sets to a classification unit; and
   ii) classifying ontology instances responsive to said classification parameters, said classification unit receiving updated classification parameters with each change in ontology files and reclassifying said ontology instances with said each change.

12. A method of automatically discovering ontology file categories, said method comprising the steps of:
   a) searching for available semantic data files;
   b) storing links and content to identified semantic data files;
   c) generating an ontology file from stored said content for each linked said semantic data file;
   d) identifying a domain for each said ontology file, said domain being identified from generated ontology files, identifying domains comprising the steps of:
      i) selecting keywords from said each ontology file,
      ii) filtering a sense from selected said keywords responsive to a lexical database, wherein filtering senses filters synsets for each keyword, and
      iii) identifying a domain in said each ontology file from said selected keywords;
   e) extracting a plurality of ontology file categories from domains identified for said generated ontology files, said ontology file categories being statistically identified automatically from said domains, wherein extracting categories comprises the steps of:
      A) measuring sense significance from filtered said synsets and providing a context measure of said each ontology file,
      B) defining a feature set containing significant senses for said each ontology file,
      C) perusing the said filtered synsets and selecting one sense for said each ontology file, said one sense being a domain representing said each ontology file,
      D) normalizing contextual significance for all domains, each normalized contextual significance providing a significance value for a respective domain, and
      E) combining discovered domains and features for generated ontology files responsive to domain significance values;
   f) providing a training set from generated ontology files, said training set including an instance set, a domain set and a feature set; and
   g) classifying ontology file instances responsive to said training sets, results of classification indicating automatic category discovery effectiveness.

13. A method as in claim 12, wherein the step (B) of defining said feature set comprises identifying significant synsets of said each ontology file, each synset representing a domain in an ontology file.

14. A method as in claim 13, wherein the step (C) of identifying said domain further comprises collecting statistics of discovered domains, collected said statistics selecting said categories representing said generated ontology files, collected said statistics providing metrics for measuring the effectiveness of category discovery.

* * * * *